United States Patent
Zioulas et al.

(10) Patent No.: US 7,443,870 B2
(45) Date of Patent: Oct. 28, 2008

(54) METHOD FOR PRIORITIZING GROUPED DATA REDUCTION

(75) Inventors: George Zioulas, Sunnyvale, CA (US); Dimitris Stassinopoulos, Sunnyvale, CA (US); Han C. Wen, San Jose, CA (US)

(73) Assignee: Opnet Technologies, Inc., Bethesda, MD (US)

( * ) Notice: Subject to any disclaimer, the term of this patent is extended or adjusted under 35 U.S.C. 154(b) by 711 days.

(21) Appl. No.: 10/923,576

(22) Filed: Aug. 20, 2004

(65) Prior Publication Data
US 2006/0039394 A1 Feb. 23, 2006

(51) Int. Cl.
*H04L 12/56* (2006.01)

(52) U.S. Cl. .................................... 370/412

(58) Field of Classification Search ............ 370/395.53, 370/412, 230, 395.41
See application file for complete search history.

(56) References Cited

U.S. PATENT DOCUMENTS

| | | | |
|---|---|---|---|
| 5,948,055 A * | 9/1999 | Pulsipher et al. | 709/202 |
| 6,282,570 B1 * | 8/2001 | Leung et al. | 709/224 |
| 6,633,835 B1 * | 10/2003 | Moran et al. | 702/190 |
| 7,218,639 B2 * | 5/2007 | Matsufuru | 370/412 |
| 7,225,223 B1 * | 5/2007 | McCarthy et al. | 709/204 |
| 2004/0196788 A1 * | 10/2004 | Lodha | 370/230 |

* cited by examiner

*Primary Examiner*—Frank Duong
(74) *Attorney, Agent, or Firm*—Blakely, Sokoloff, Taylor & Zafman LLP

(57) ABSTRACT

Nodes of a network may be allocated to a number of logical groups thereof, and storage space within a network traffic monitoring device coupled to the network then allocated so as to ensure network traffic data for at least a minimum number of the nodes of each of the logical groups is stored.

12 Claims, 1 Drawing Sheet

METHOD FOR PRIORITIZING GROUPED DATA REDUCTION

FIELD OF THE INVENTION

The present invention relates to methods for ensuring network traffic data for at least a minimum number of network nodes of a number of logical groups of such nodes is stored at each of several time scales.

BACKGROUND

Packet-switched networks such as those that utilize the Internet protocol are essential tools of many of today's businesses. Hence, it is essential that these networks be monitored to ensure the network traffic encounters minimal delays and other problems during transport. Such monitoring, however, involves the collection and storage of significant amounts of data. This presents several challenges, among them the problem of how to ensure data is collected for at least a minimum number of network nodes of a number of logical groups of such nodes at each of several time scales.

SUMMARY OF THE INVENTION

Nodes of a network may be allocated to a number of logical groups thereof, and storage space within a network traffic monitoring device coupled to the network then allocated so as to ensure network traffic data for at least a minimum number of the nodes of each of the logical groups is stored. This allocation scheme may be replicated at each of a number of time scales for the network traffic data. In one embodiment of the present invention, the storage space is allocated such that each logical group is permitted storage space for up to a minimum number of nodes determined by a ratio of a total number of nodes of the network and the number of logical groups of said nodes. Any excess storage space resulting from an absence of at least the minimum number of nodes in one or more of the logical groups of nodes may then be reallocated to those of the logical groups of nodes having more than the minimum number of nodes (e.g., on a round-robin, traffic volume, or number of nodes per group basis).

DETAILED DESCRIPTION

Figure 1:
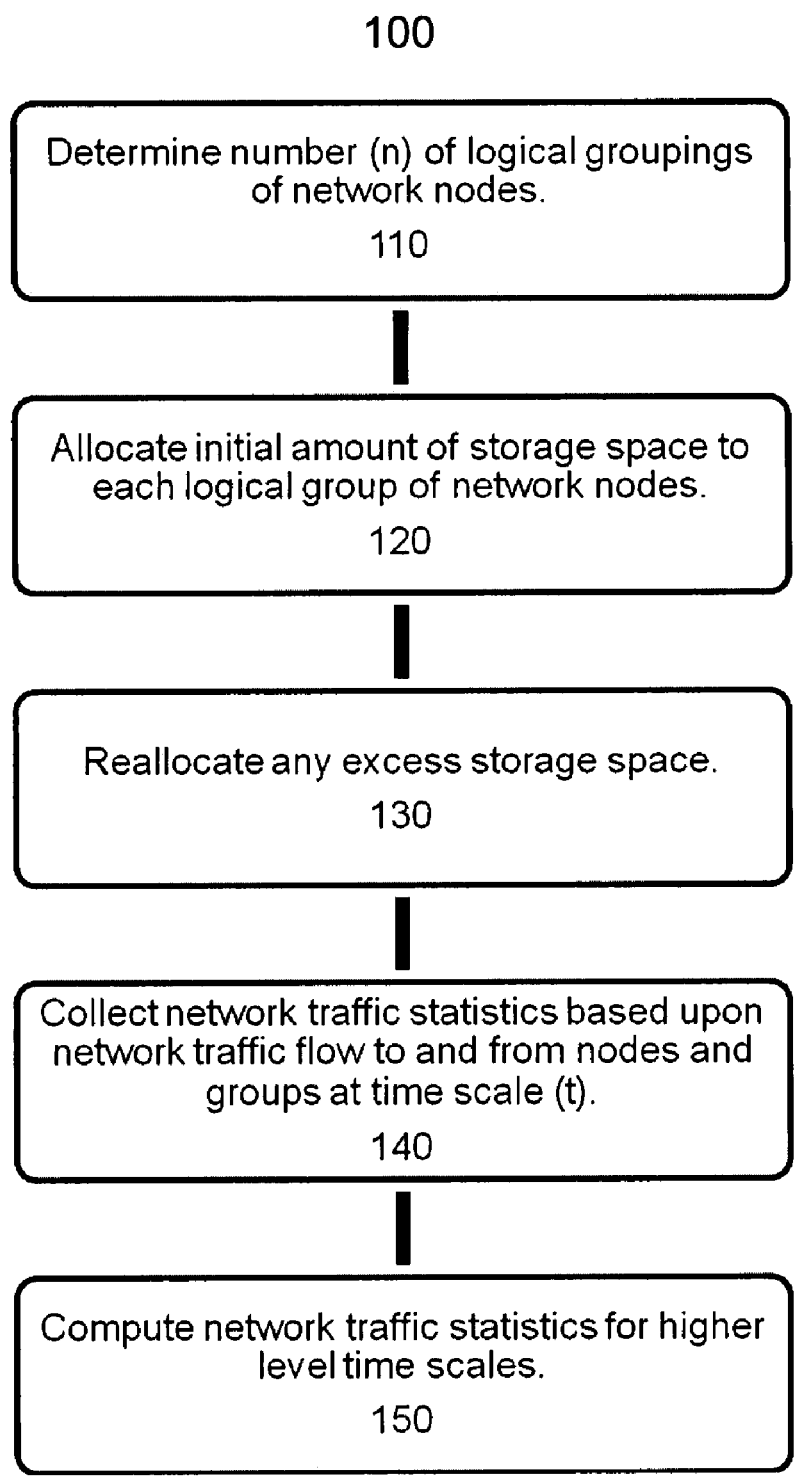
FIG. 1 shows a method for allocating storage for network traffic data Statistics.

Described herein are methods for ensuring network traffic data for at least a minimum number of network nodes of a number of logical groups of such nodes is stored at each of several time scales at a network traffic monitoring device.

In a typical configuration, the network traffic monitoring device is coupled to an enterprise network (e.g., at an edge of such a network) and configured in such a way as to collect statistics regarding traffic (e.g., packets) flowing into, out of and within that network. In some cases, the network traffic monitoring device may be configured to group data so collected according to logical groups of network nodes within the enterprise network. For example, such groupings may be made at a business unit or other logical level. However, because the storage capacity of the network monitoring device is not infinite, and because some enterprise networks can consist of thousands of nodes, the network traffic monitoring device cannot collect and store data regarding all nodes of such logical groupings.

Because it is desirable to have at least some data collected for each of the various logical groupings of network nodes, for example to allow users to monitor traffic conditions affecting all such groupings, some decision regarding the allocation of the finite network traffic monitoring device's storage capacity must be implemented. In accordance with the present invention, the storage capacity is allocated so as to ensure that network traffic data for at least a minimum number of network nodes of each logical group of such nodes is stored at each of several time scales. Any excess storage capacity may then be allocated to those logical groups of nodes that need or might benefit from same.

By way of example, at block 110, consider a network that includes "n" logical groupings of network nodes. Each group includes at least one network node, but the groups need not include the same number of nodes each. The rationale behind the logical groupings of nodes is not critical to the present invention, but for purposes of this example assume that the logical groupings correspond to business units of the enterprise utilizing the network.

Each node of the network has an associated Internet protocol (IP) address. This is a unique node identifier that, among other things, acts as an address for other nodes to send traffic to, much in the same way as a post office address is used to ensure that mail is properly delivered. Collectively, the entire enterprise network has a total of "M" IP addresses associated therewith. M is the maximum number of IP addresses for which data needs to be collected by the network traffic monitoring device.

As indicated above, for a network of any substantial M, the network traffic monitoring device cannot store data for all M IP addresses. Hence, at block 120, some minimal allocation of this limited storage space is needed to ensure that for each of the n logical groupings of the IP addresses (i.e., the nodes associated therewith), some data is stored. In one embodiment of the present invention, this minimal number is determined by the ratio of M to n ($M/n=y$). That is, for each logical group, the network traffic monitoring device will initially allocate storage space for at least y IP addresses of such group.

Some logical groups will, however, have fewer than y IP addresses associated therewith. Hence, there will be excess storage space available at the network traffic monitoring device. At block 130, rather than allow this excess space to go unused, the network traffic monitoring device will allocate it to those logical groups consisting of more than y IP addresses. Such allocation can be made in any of several ways, including but not limited to round-robin allocation, allocation based on traffic volume, allocation based on number of IP addresses per group, etc.

Thus, the above allocation scheme ensures that for each logical grouping of nodes of the enterprise network, the network traffic monitoring device will store data for at least some IP addresses (nodes) of each group. A further refinement of this allocation technique involves maintaining this same strategy across multiple time scales. That is, for network traffic data grouped according to different time scales, the same allocation scheme may be employed.

At block 140, consider that the network traffic monitoring device may collect traffic statistics at any of a variety of time scales. Minute-by-minute collection is typical. However, a user may not want to view the data at such a low level of granularity. Instead, the use may wish to view the data at a higher level of granularity, such as an hour-by-hour or even day-by-day basis. At block 150, in accordance with an embodiment of the present invention, These higher-level statistical compilations may be pre-computed by the network traffic monitoring device so that when called for by the user there is no appreciable delay in presenting the results. In order to ensure that the limited storage space of the network traffic monitoring device is not overwhelmed by such additional storage requirements, the same allocation scheme as discussed above may be applied to the data compilations for these higher-level results.

Thus, methods for ensuring network traffic data for at least a minimum number of network nodes of a number of logical groups of such nodes is stored at each of several time scales at a network traffic monitoring device have been described. In the foregoing description, various examples were set forth in order to aid in the understanding of the present invention. These examples, however, should not be read to limit the scope of the present invention, which instead should only be measured in terms of the following claims.

What is claimed is:

1. A method, comprising:

allocating nodes of a network to a number of logical groups thereof, wherein said nodes include devices capable of sending or receiving data over the network; and allocating storage space within a network traffic monitoring device coupled to the network so as to ensure network traffic data for at least a minimum number of the nodes of each of the logical groups is stored, wherein said network traffic data includes statistics regarding network traffic flow to and from said minimum number of nodes.

2. The method of claim 1, wherein the storage space is allocated at each of a number of time scales for the network traffic data.

3. The method of claim 2, wherein the storage space is allocated such that each logical group is permitted storage space for up to a minimum number of nodes determined by a ratio of a total number of nodes of the network and the number of logical groups of said nodes.

4. The method of claim 3, wherein any excess storage space resulting from an absence of at least the minimum number of nodes in one or more of the logical groups of nodes is reallocated to those of the logical groups of nodes having more than the minimum number of nodes.

5. The method of claim 4, wherein the reallocation of the excess storage space is made on a round-robin basis.

6. The method of claim 4, wherein the reallocation of the excess storage space is made on a traffic volume basis.

7. The method of claim 4, wherein the reallocation of the excess storage space is made on a number of nodes per group basis.

8. The method of claim 1, wherein the storage space is allocated such that each logical group is permitted storage space for up to a minimum number of nodes determined by a ratio of a total number of nodes of the network and the number of logical groups of said nodes.

9. The method of claim 8, wherein any excess storage space resulting from an absence of at least the minimum number of nodes in one or more of the logical groups of nodes is reallocated to those of the logical groups of nodes having more than the minimum number of nodes.

10. The method of claim 9, wherein the reallocation of the excess storage space is made on a round-robin basis.

11. The method of claim 9, wherein the reallocation of the excess storage space is made on a traffic volume basis.

12. The method of claim 9, wherein the reallocation of the excess storage space is made on a number of nodes per group basis.

* * * * *